(12) United States Patent
Palmer

(10) Patent No.: US 6,178,909 B1
(45) Date of Patent: Jan. 30, 2001

(54) WATER CRAFT AND DOCK PROTECTOR ASSEMBLY

(76) Inventor: Randy C. Palmer, 419B Fants Grove Rd., Anderson, SC (US) 29625

( * ) Notice: Under 35 U.S.C. 154(b), the term of this patent shall be extended for 0 days.

(21) Appl. No.: 09/344,421

(22) Filed: Jun. 25, 1999

(51) Int. Cl.[7] .................................................. B63B 59/02
(52) U.S. Cl. ............................................................. 114/219
(58) Field of Search ................................... 114/219, 220; 405/212, 213

(56) References Cited

U.S. PATENT DOCUMENTS

| | | |
|---|---|---|
| 747,660 | 12/1903 | Swearingen . |
| 3,145,685 | 8/1964 | Kulick, Sr. ............................. 114/220 |
| 3,937,170 | 2/1976 | Drewett ................................. 114/219 |
| 3,991,582 | 11/1976 | Waldrop et al. ........................ 61/48 |
| 4,058,984 | 11/1977 | Weidler, Jr. et al. .................... 61/48 |
| 4,098,211 | 7/1978 | Files et al. ............................ 114/219 |
| 4,715,310 | 12/1987 | Curtis et al. .......................... 114/220 |
| 5,441,006 | 8/1995 | Wood .................................. 114/220 |

*Primary Examiner*—S. Joseph Morano
*Assistant Examiner*—Ajay Vasudeva
(74) *Attorney, Agent, or Firm*—Flint & Kim, P.A.; Robert R. Reed

(57) ABSTRACT

The present invention provides a protector assembly or fence type structure that is easily installed along the sides of a dock where water craft are docked or attempting to become docked. The fence type structure protects the water craft as well as the dock from being damaged. The invention includes a frame with spaced apart vertical members supporting a horizontal array of vertically supported tubular roller members which rotate when contact is made with a water craft as it approaches the dock. The fence type structure is attached by a bracket to a top side area of the dock so that it hangs vertically and extends to a location near the surface of the water. The fence type structure can be rotated about the top bracket to a position up and out of the water for cleaning and repairing, as well as for removing debris which may have been trapped by the dock structure and the fence type structure of this invention.

19 Claims, 6 Drawing Sheets

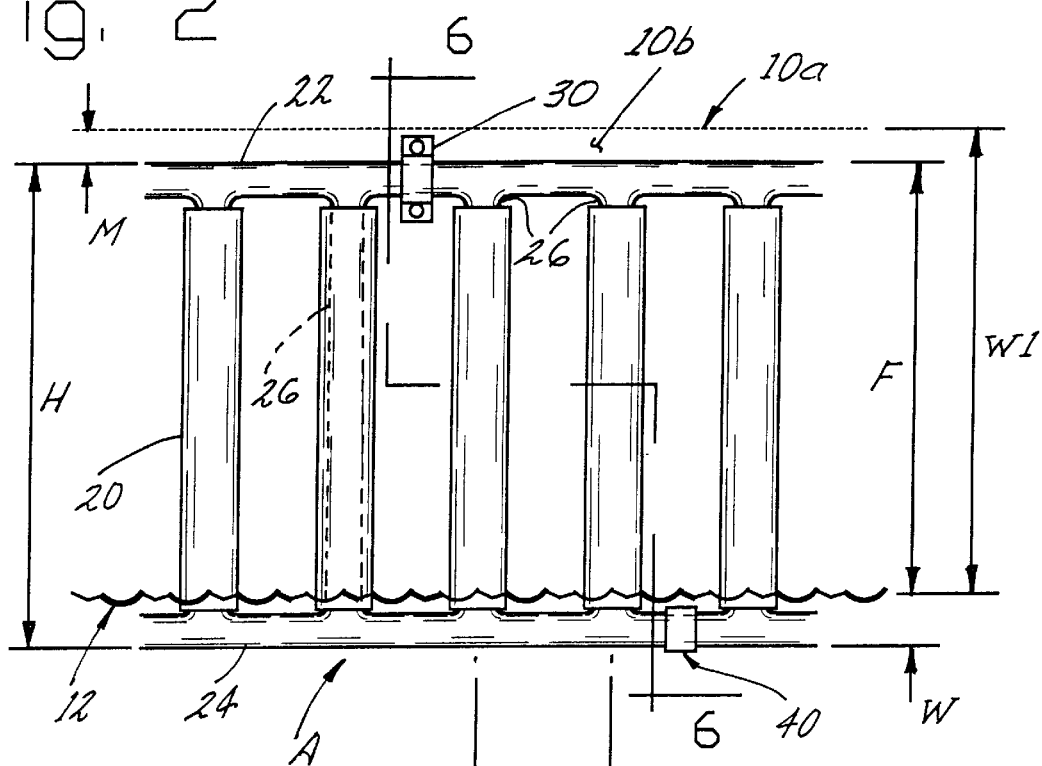
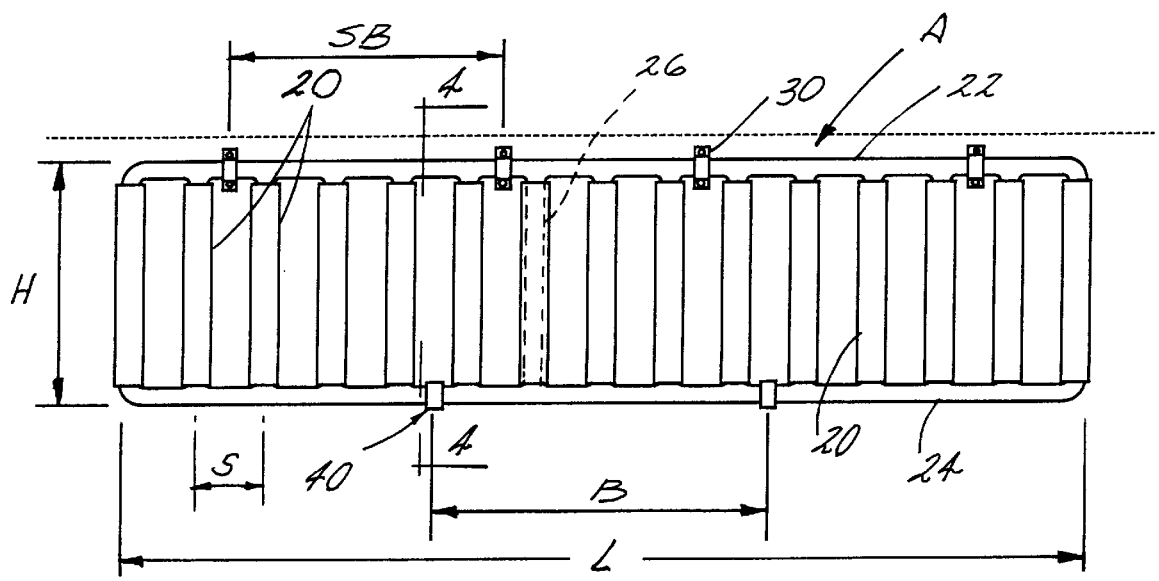

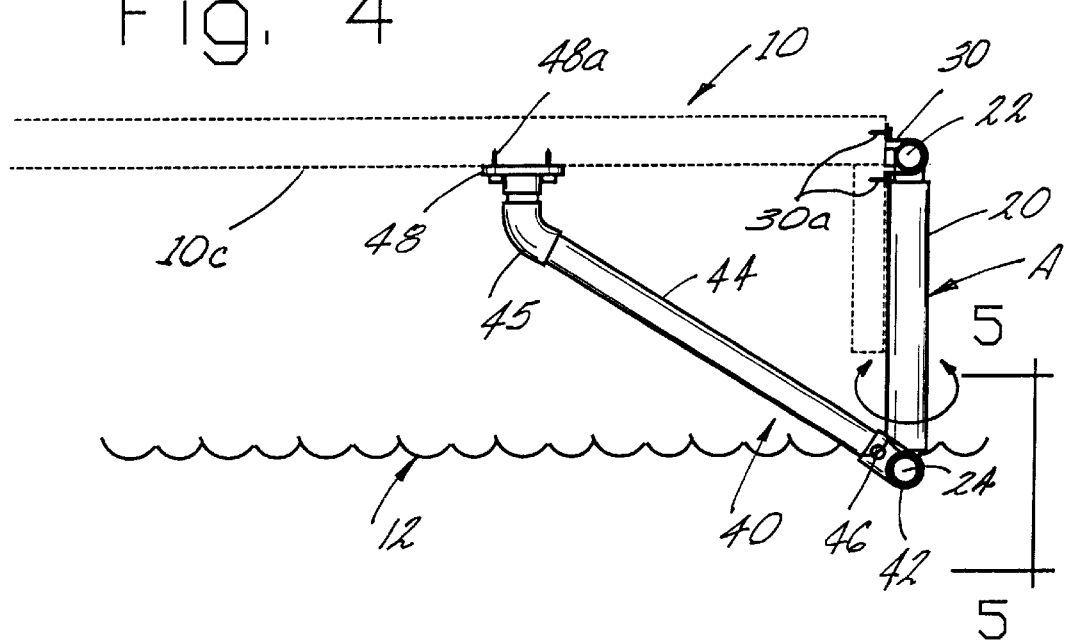
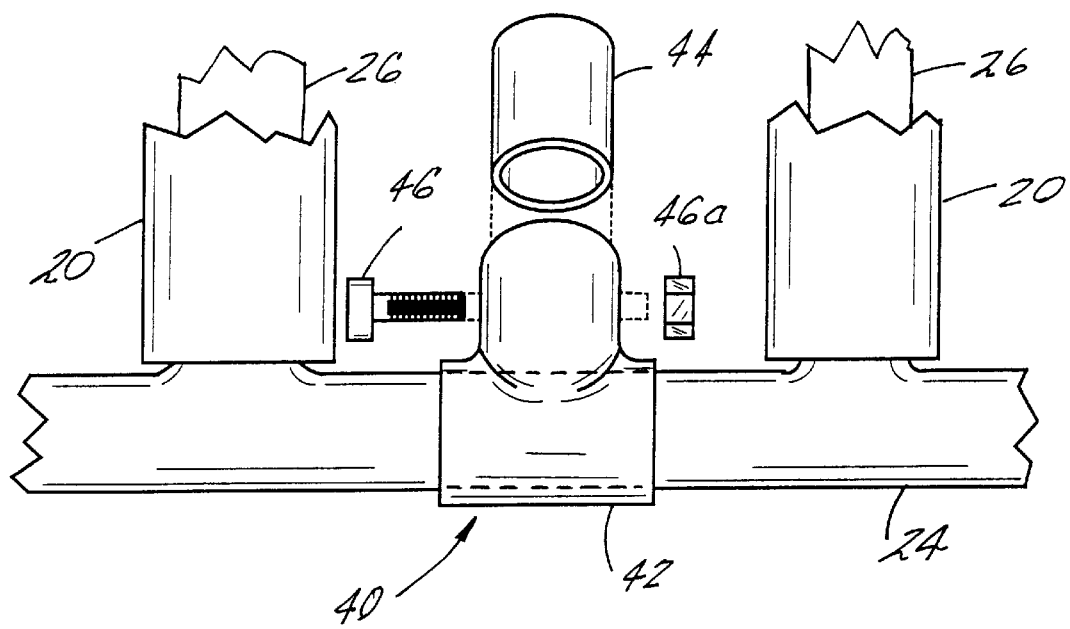

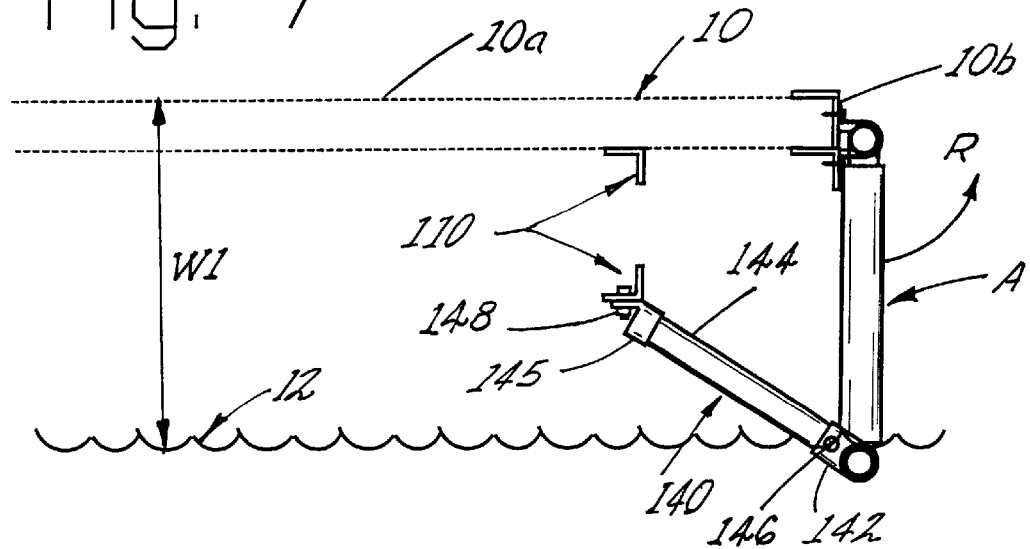
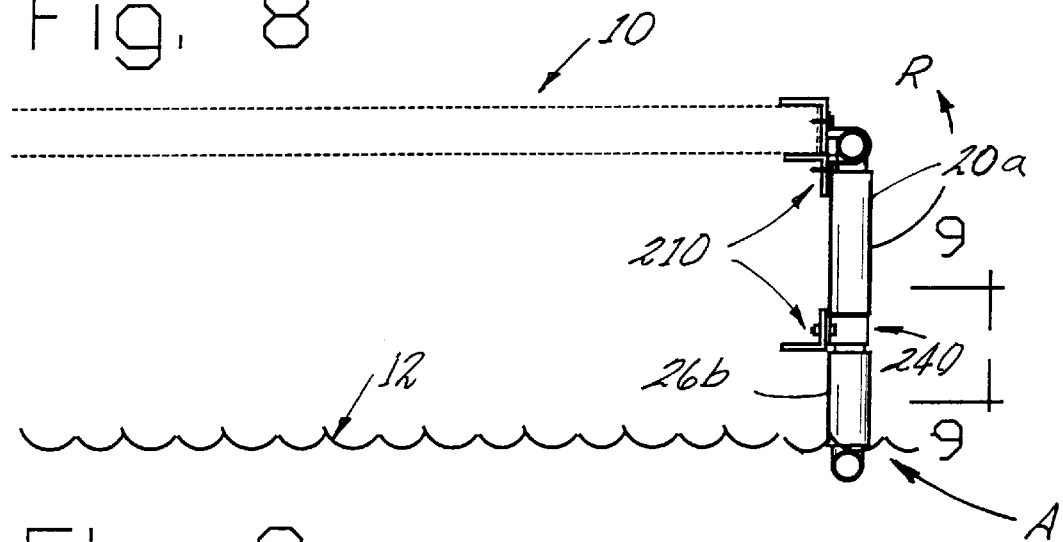
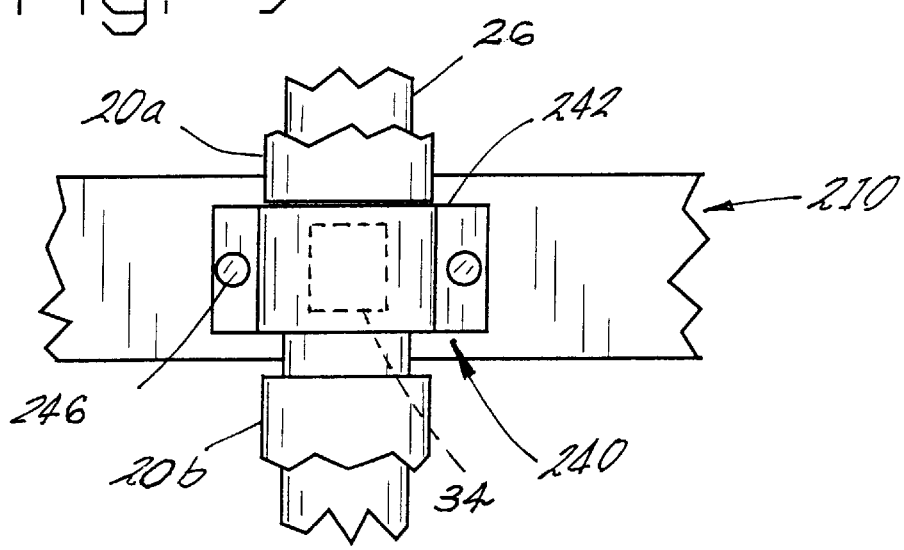

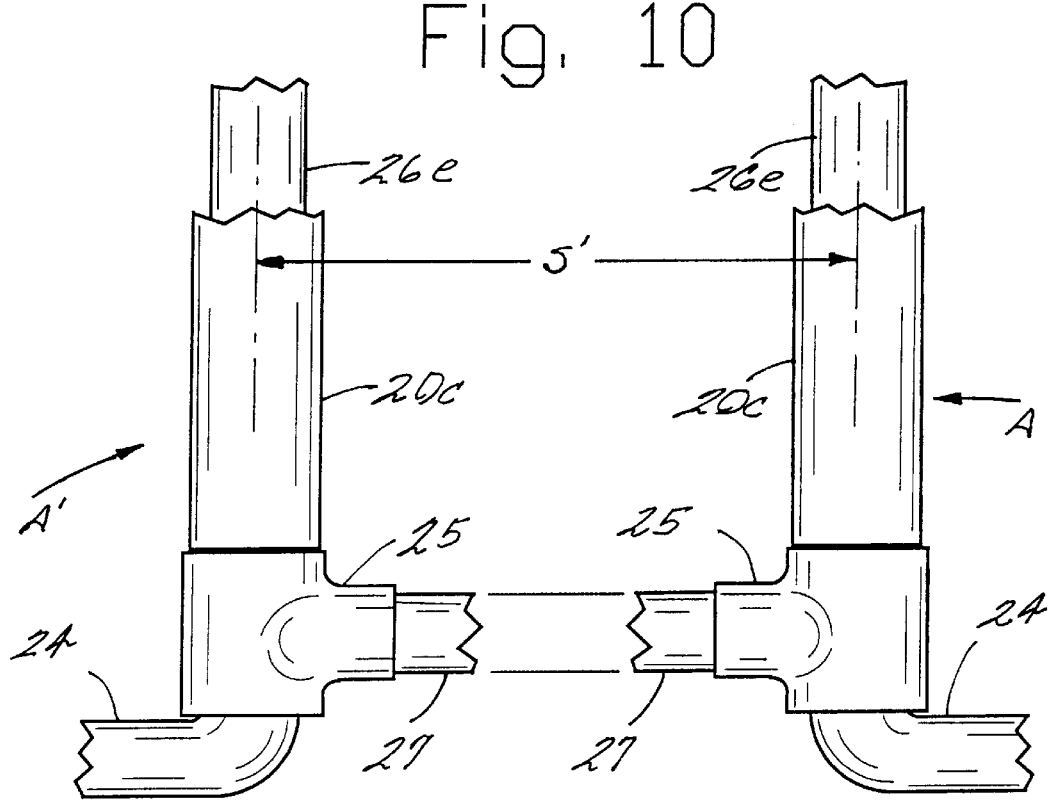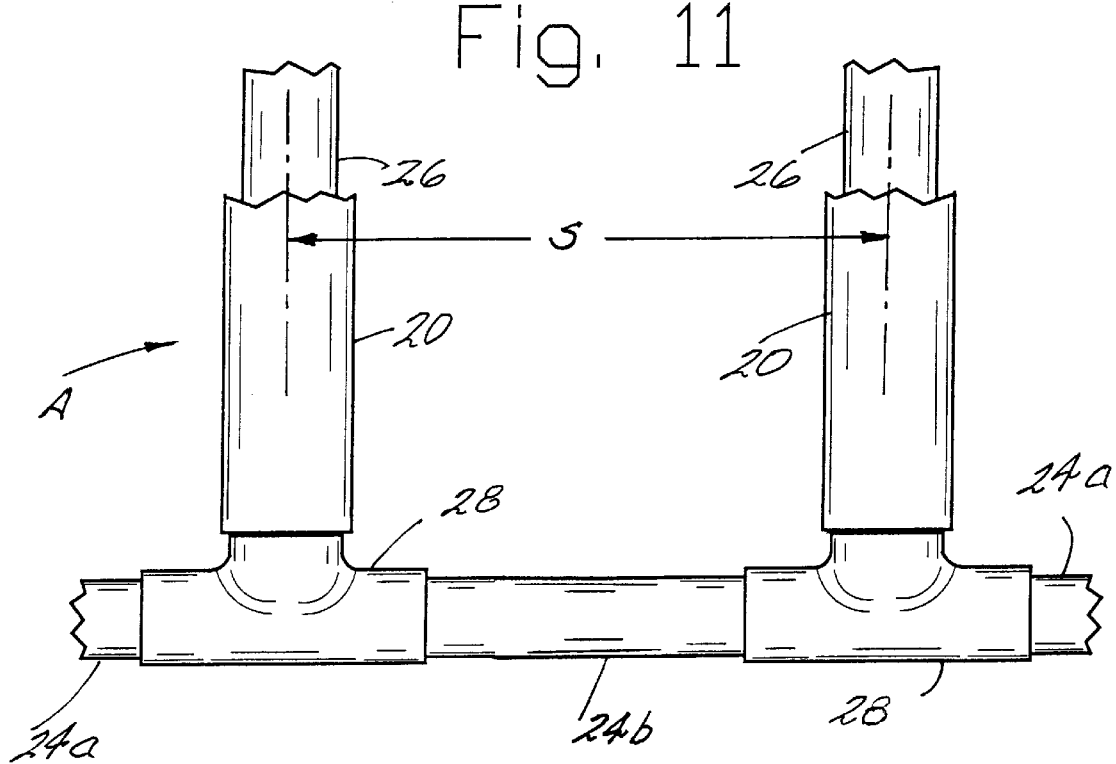

WATER CRAFT AND DOCK PROTECTOR ASSEMBLY

BACKGROUND OF THE INVENTION

This invention is directed to a structure placed along the side of a dock for protecting the dock as well as water craft against damage, and is particularly suited for use on a floating dock when docking various water craft at a private or commercial dock.

Damage to water craft such as powered boats and jet skis are common when attempting to dock the water craft at a dock. The control of the craft approaching the dock is influenced by the wave action of the water and the ability of the operator of the craft to steer and reduce power in a proper manner, which will result in a smooth approach to the dock. The elevation of the dock above the water and the exposed dock structure along a side of the dock where the craft is docking are also important when approaching the dock. The structural features of the craft and the amount of load carried by the craft further influences what surface areas of the craft are exposed to damage by contacting the structure of the dock. The cost of repairing the craft and/or the dock can be substantial.

A further consideration when providing a dock protector assembly is to provide for protection when the water craft remains tethered to the dock after it has docked. The protector assembly cannot become displaced from the dock with continued docking of the water craft at the side of the dock.

Protection for water craft and docks have been provided by hanging or attaching bumper guards, such as plastic foam articles or used tires, along the side of the dock for cushioning the impact of the water craft against the dock. This type of protection is only partially successful and the resulting appearance is not desirable. In addition, it is difficult to adequately cover all side areas of the dock by bumper guards and also provide an area to load and unload the water craft.

The typical dock protector device becomes soiled during its normal use. The ability and means for easily accessing a typical device for cleaning is limited within the art. In addition, those devices which extend near or below the surface of the waterway have the ability to trap or catch debris floating at the surface of the water. Debris may accumulate and damage both the dock and the device protecting the dock and the water craft. The need remains to address the cleaning and debris catching problems associated with the devices of the art.

Means for protecting various structures from damage by boats or other floating vessels are disclosed in the literature. Numerous shock absorbing systems have been used for protecting docks, bridge piers, offshore platforms and the like. The disclosures of U.S. Pat. Nos. 747,660; 3,145,685; 3,991,582; 4,098,211; and 4,715,310 illustrate a single series of rings or buffers spaced vertically along a column and supported by a frame attached to the structure being protected.

In U.S. Pat. Nos. 747,660 and 3,145,685 the disclosures show different guards or bumpers for bridge piers and piles or mounted on the deck of a boat having roller-buffers extending below the water level and movable when contact is made with a boat. These guards or bumpers have a number of rollers on a single shaft and the use of a series of these guards is not practicable.

In U.S. Pat. Nos. 3,991,582; 4,098,211; and 4,715,310 the disclosure shows rotating bumper systems for use on marine structures. Once again these patents show a stacked series of rollers on a shaft or column and, once again, the use of a series of these systems is not practicable.

An array of beads or rollers secured together can be used to cover an area of the dock. In U.S. Pat. No. 5,441,006 a protective mat assembly includes large beads which are secured together in an array with ropes. The beads are disposed in both the horizontal and vertical directions to rotate about the ropes to provide a boat fender as the boat moves relative to another object that contacts the mat assembly. The assembly remains with the boat rather than the dock and damage from the vertical movement of the boat is a critical feature of this disclosure.

The disclosures of U.S. Pat. Nos. 3,937,170 and 4,058,984 illustrate a fence type structure to provide a bumper guard or cushioning unit to prohibit entry or provide a gate for a marine structure.

The U.S. Pat. No. 3,937,170 discloses a gate type structure with elongated bumper guards to protect the structure and vessel when contact is made. The spaced apart vertical members have an elastic body which absorbs shock. The bumper guards have no ability to rotate and eliminate sliding friction when in contact with a marine vessel. A Similar features are present in U.S. Pat. No. 4,058,984.

The need remains to providing a simple protector or fence type structure for keeping water craft and a dock from being damaged. A particular need exists when applied to the use of private and commercial docks supporting the use and storage of fishing boats and other water craft; such as those that exist on lakes and streams across the United States. The art does not describe or illustrate a continuous side protecting type structure that will generally eliminate damage to the dock or the water craft.

Accordingly, an object of the present invention is to provide a simple protector assembly or fence type structure which will provide generally continuous protection along the sides of a dock against damage from or damage to a water craft which is docked or attempting to dock.

Another object of the present invention is to provide an ability to rotate the fence type structure of the invention up and out of the water for removal of debris, cleaning and repairs.

Still another object of the present invention is to provide a protector assembly for docking a water craft as well as for tethering the water craft at the dock for extended periods of time.

A further object of the present invention is to provide a protector assembly for a dock which is easy to install and cost effective for the private user of small water craft, including canoes, row boats, powered boats, jet skis and the like.

SUMMARY OF THE INVENTION

The above objectives are accomplished according to the present invention by providing a protector assembly or fence type structure that is easily installed along the sides of a dock. The invention includes a frame with spaced apart vertical members supporting a horizontal array of tubular roller members which rotate when contact is made with a water craft as it approaches the dock. The fence type structure is attached by a bracket to a top side area of the dock so that it hangs vertically and extends to a location near the surface of the water. The structure can be rotated about the bracket to a position up and out of the water for cleaning and repairing, as well as for removing debris which may have been trapped by the dock structure and the protector assembly of this invention.

In one aspect of the invention a protector assembly is provided for safe operation of a water craft in water adjacent a dock. The assembly comprises horizontal top and bottom members placed along a side area of the dock so that the top member is rotatably attached to the dock and the bottom member is generally positioned below a surface of the water. A plurality of spaced apart vertical members are each affixed at a top end to the horizontal top member and at a bottom end to the horizontal bottom member to generally form a protective fence type assembly. The invention further comprises a tubular roller member placed around each one of the vertical members to generally extend between the horizontal top and bottom members. The roller members freely rotate about the vertical members when forced to turn by making contact with the water craft. Finally, a plurality of top support brackets are provided for attaching the horizontal top member to an upper side surface of the dock such that the fence type assembly can be rotated relative to the dock for cleaning and repairing the fence as well as removal of debris.

In another aspect of the invention a fence type structure is provided for preventing a water craft from making contact with a dock structure while docking. The structure comprises a top member rotatable attached to a side surface of the dock using a support bracket. A bottom member located below the top member is positioned generally below the surface of the water adjacent the dock. Vertical spaced apart members are affixed to the top member at one end and to the bottom member at the other end. The structure further comprises a tubular roller member coexisting with each vertical member such that the vertical member extends freely through the tubular roller member to provide vertical support for the roller member without limiting the ability of the roller member to rotate when contacted by the water craft. The structure is rotated about the support bracket for cleaning repairing and for removal of debris trapped by the structure.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 2 is a partial front elevation view of the protector assembly showing the relationship of the assembly with respect to the top surface and side of the dock and the surface of the water;

FIG. 3 is an elevation view of one protector assembly of the invention showing the means for supporting the assembly along the side of a dock;

FIG. 4 is a sectional view of the protector assembly of the invention taken along line 4—4 of FIG. 3 and showing a first bottom support fixture for laterally supporting the bottom horizontal member of the assembly and the ability to rotate the assembly when the first bottom support fixture is released;

FIG. 5 is a partial elevation view taken along line 5—5 of FIG. 4 and showing the first bottom support fixture with a removable fastener;

FIG. 7 is a sectional view of the protector assembly of the invention taken along line 4—4 of FIG. 3 and showing a second bottom support fixture for laterally supporting the bottom horizontal member of the assembly and the ability to rotate the assembly when the second bottom support fixture is released;

FIG. 8 is a sectional view of the protector assembly of the invention taken along line 4—4 of FIG. 3 and showing a third bottom support fixture for laterally supporting the bottom horizontal member of the assembly and the ability to rotate the assembly when the third bottom support fixture is released;

FIG. 9 is a partial elevation view of the third bottom support assembly of FIG. 8;

FIG. 10 is a partial front elevation view taken at a lateral end of the protector assembly of FIG. 3 showing a first connecting structure between two adjacent protector assemblies of the invention; and FIG. 11 is a front partial front elevation view of the protector assembly of the invention showing a standard fitting used to connect horizontal members with vertical members according to another aspect of the invention.

DESCRIPTION OF A PREFERRED EMBODIMENT

Figure 1:
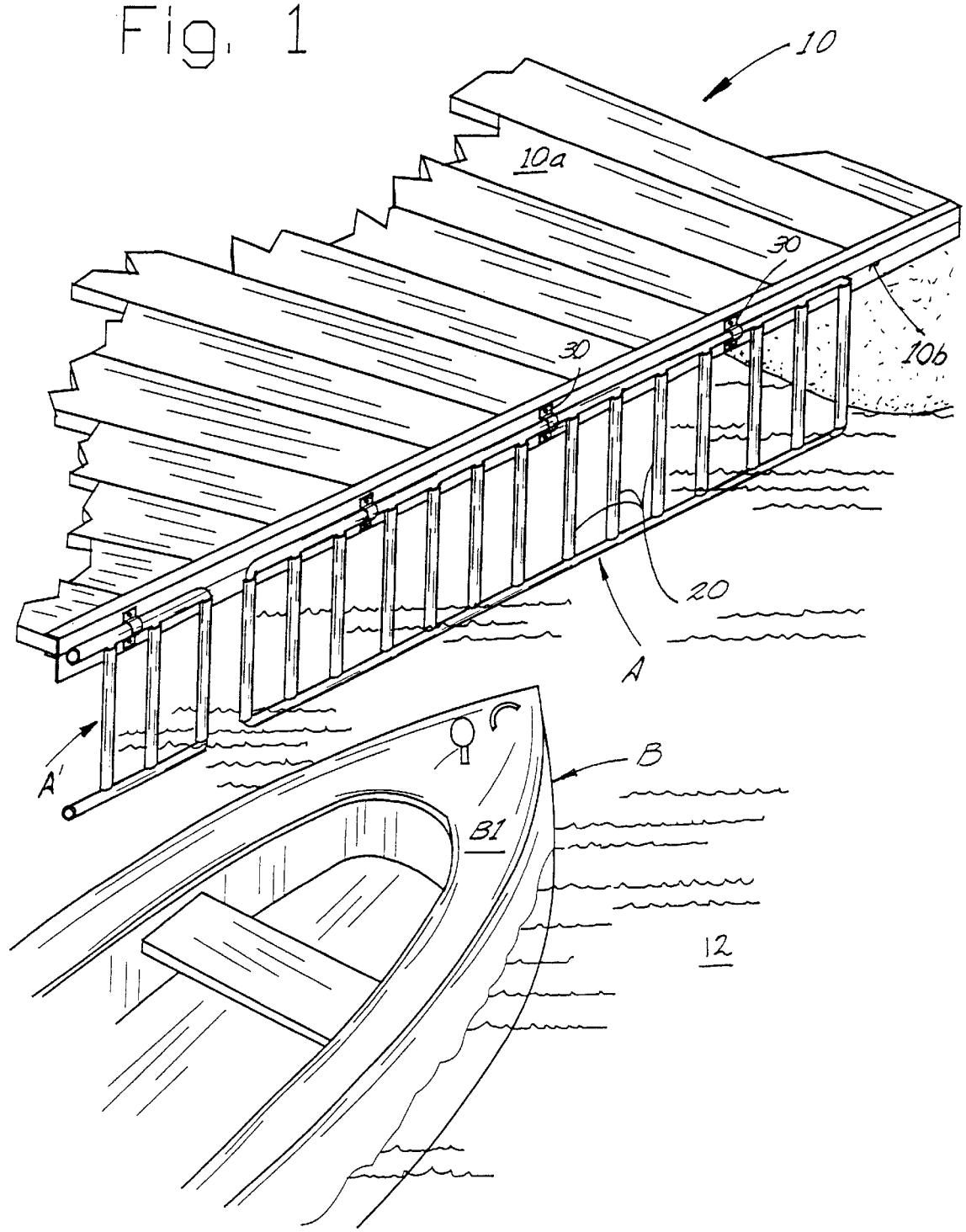
FIG. 1 is a perspective view of a water craft approaching a dock having the protector assembly or fence type structure of the invention along one side of the dock.

Referring now in more detail to the drawings, the invention will now be described in more detail. The water craft generally approaches the side area of a dock at an oblique angle as it starts its docking maneuvers. Docks can be a floating type dock or a fixed dock supported by piers from the ground. The elevation of the dock relative to the water surface is an important consideration as water craft approach the dock. Any structure assembled to protect the dock should be designed to avoid contact between the water craft and the dock structure which would damage the water craft or the dock. Referring to FIG. 1, the protector assembly A of this invention extends along the length of the dock 10 from a location near the top surface 10a of the dock to a location near the water surface 12. Preferably the protector assembly extends to a location below the water surface to give more complete protection. With a floating dock the location of the bottom of the protector assembly relative to the water surface remains generally constant and can be controlled by the vertical height of the protector assembly. With a fixed dock the vertical height of protector assembly A is made large enough to account for the low water level that may exist from time to time.

A water craft B is approaching dock 10 at an angle as illustrated in FIG. 1. The protector assembly or fence type structure A is attached to a dock side surface 10b directly below a dock top surface 10a. The protector assembly extends downward to a location near the water surface as water craft B approaches. The fence type structure includes a series of horizontally spaced apart tubular roller members 20 that rotate when contact is made between water craft B and the fence type structure. The fence type structure prevents damage to water craft surface areas B1. The side surface 10b of the dock and its supporting structure are also protected. In addition, without the protector assembly of this invention, the water craft can extend under the lateral edge of the dock to contact the dock structure causing extensive damage to both the water craft and the dock structural components.

A series of fence type structures A' can be placed end to end to cover any desirable side length of the dock. The size of each individual fence type structure can vary to fit side features and dimensions of the dock within the scope of this invention.

A detailed front elevation view of a portion of protector assembly A is illustrated in FIG. 2. The protector assembly has a horizontal top member 22 and a horizontal bottom member 24. Spaced apart vertical members 26 are affixed between the horizontal top member and the horizontal bottom member. Each vertical member supports a tubular roller member 20 by extending through the tubular member. The tubular roller member is "free to rotate" about the vertical member when contact is made with an exterior surface area 20a of the tubular roller member forcing it to turn. Free to rotate in this case means no bearings or special attachment devices between the vertical member and the tubular roller member is needed or desirable. The weight of the tubular roller member is generally supported at its lower end on the horizontal bottom member.

Depending on the longitudinal slope of the top surface of the dock, the horizontal top member may deviate from being truly horizontal. The horizontal top member should be placed near the top surface of the dock to provide complete side protection. The horizontal top member can be on a slope to conform to the longitudinal slope of the dock within the scope of this invention. Generally speaking, the largest longitudinal slope of the dock is adjacent the shore line where the dock is anchored. This is a side area of the dock where water craft are not docked because of shallow water, and the protector assembly is not needed.

For a typical protector assembly (i.e. one use with a private dock on a lake) the horizontal top and bottom members, the vertical members and the tubular roller members can be made using conventional size plastic pipe such as a polyvinyl chloride (PVC) and the like. Standard pipe sizes used for the present invention vary from about ¾ inch to about 2½ inches. Preferred pipe sizes for most private and light commercial docks vary from about ¾ inch to about 1¼ inches. Protector assemblies made of other material such as aluminum, copper or other metallic materials can be used for larger protector assemblies and special environmental applications. Special coatings may also be used to assist the protector assembly to withstand the environment where it is used. In addition, the tubular roller members and/or the vertical members may be coated to reduce the twisting forces necessary for rotation of tubular roller members 20 about vertical members 26. Standard pipe sizes of each tubular roller member should be at least one size larger than the size of a respective vertical member.

The protector assembly is supported by at least one top support bracket 30 placed around horizontal top member 22 which is attached to the dock near dock surface 10a. A top mounting distance M is selected to provide maximum protection without influencing the docking operations of the water craft, as illustrated in FIG. 2. The top support bracket is spaced from the horizontal top member so that the entire protector assembly can rotate about the top support bracket. The protector assembly has an assembly height H which generally allows the horizontal bottom member to be positioned near the water surface 12. The water surface is located below the dock surface a distance W1, which can vary depending on the type of dock (fixed or floating), the longitudinal slope of the dock and the weight supported by the dock. A water depth F below the top of the protector assembly can also vary. The preferred water depth is such that assembly height H is generally greater than water depth F to protect portions of the water craft near the water surface. In addition, the lateral stability of the protector assembly is improved by having horizontal bottom member 24 located below water surface 12.

When necessary, protector assembly A can be laterally supported from the dock by the addition of a bottom support fixture 40. The need for laterally supporting the bottom of the protector assembly depends on the inherent lateral movement of the water and the amount of lateral force that may occur when contact with the water craft is made. The structural details of a bottom support fixture depend on what dock structure is present to provide a base for lateral support of the protector assembly. Details for various bottom support fixtures are disclosed further in the later sections of this disclosure.

The number and spacing of top support brackets 30 for attaching the horizontal top member 22 to the dock, as well as bottom support fixtures 40 holding the horizontal bottom member 24, depend on the height H and length L of the protector assembly, as illustrated in FIG. 3. For example, with a private dock on a lake the protector assembly or fence type structure size has a preferred height H of about 20 inches to about 30 inches and a preferred assembly length L of about 3 feet to about 10 feet consistent with conventional dock structures available in the industry. The preferred tubular roller member spacing S is from about 4 inches to about 8 inches to limit the ability of water craft to penetrate between roller members 20. Bottom support fixtures 40 are optional depending on how efficiently the protector assembly performs in the environment to which it is subjected. A bottom support fixture spacing B varies for this example from about 4 feet to about 6 feet. If any is required, a single bottom support fixture is preferred.

A cross-sectional view of a typical protector assembly A is illustrated in FIG. 4. This view is taken along line 4—4 in FIG. 3. Top support bracket 30 partially encircles horizontal top member 22 and is attached by fasteners 30a to dock 10 near the top lateral edge of the dock such that the protector assembly is free to rotate with respect to the top support bracket. Tubular roller member 20 is free to rotate in either direction when the protector assembly is in a generally vertical position, as shown by the curved double arrow.

One aspect of a bottom support fixture 40 is illustrated in FIGS. 4 and 5; where FIG. 5 is a partial elevation view taken along line 5—5 of FIG. 4. A bottom support member 42 holds horizontal bottom member 24 from moving laterally with respect to dock 10. Preferably a loose fit is provided between the bottom support member and the horizontal bottom member. A bottom brace 44 is removably attached to the bottom support member by providing a removable fastener 46. Any convenient type of removable fastener device can be used to provide easy access and quick removal. The fastener must be removed, or the bottom support fixture disengaged, before the main portion of protector assembly A can be rotated upward for cleaning or repairs, as previously disclosed. For example, a conventional bolt with a nut 46a can be used as illustrated in FIG. 5. In this example the bottom support member remains attached to the horizontal bottom member, but is disengaged from providing any lateral support. Alternately, the bottom support fixture can be made to be totally disengaged from the remainder of the protector assembly.

Depending on what dock structure is available to react lateral forces on the protector assembly determines how the bottom brace 44 is further supported. For example, FIG. 4 shows the bottom side 10c of the dock is the most convenient support structure for the bottom brace. Support is provided by a angle adjustment member 45 and a brace attachment member 48 with fasteners 48a.

Figure 6:
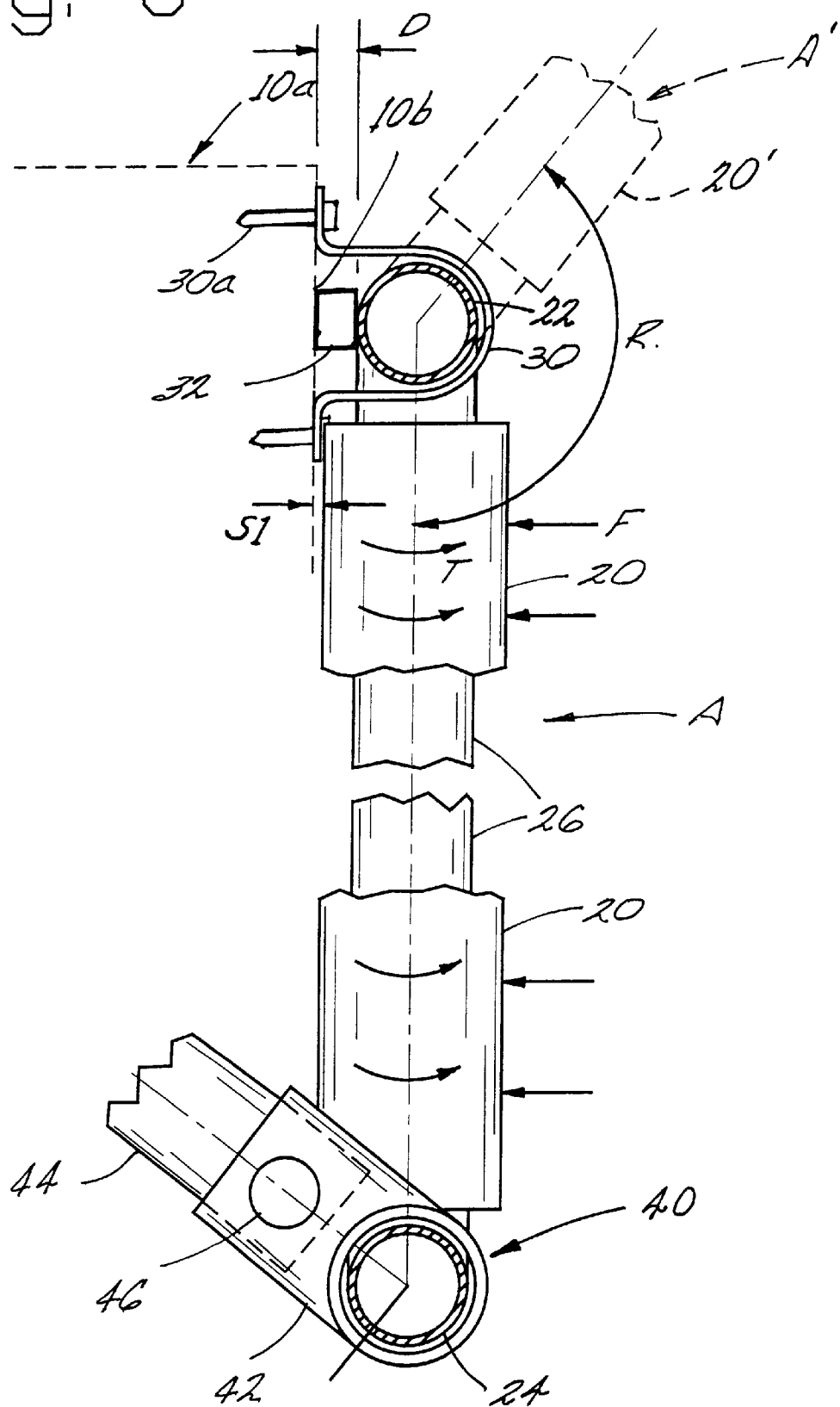
FIG. 6 is a cross-sectional view of the protector assembly of the invention taken along line 6—6 in FIG. 2 and showing a bottom support fixture and the ability to rotate the assembly about the top support bracket when released from the bottom support fixture.

A large scale section view of protector assembly A taken along line 6—6 of FIG. 2 is illustrated in FIG. 6. The horizontal top member is supported in place along the top of side surface 10b of the deck by top support bracket 30. The support bracket is attached to the dock by support bracket fasteners 30a. The top support bracket and the bracket fasteners retain the horizontal top member to function so that rotation of the horizontal top member within the top support bracket is possible. The protector assembly A must be displaced through the rotation angle R for cleaning, repairing and removal of debris, as previously disclosed. The rotation angle may be as large as 180 degrees or more for the rotated protector assembly A'.

For the top support illustrated in FIG. 6, a plurality of spacer members 32 may be required to position horizontal top member 22 an offset distance D from side surface 10b of the dock. Without the spacer members, a spacial distance S1 between the tubular roller members 20 and side surface 10b of the dock may become zero. The result of a zero spacial distance, S1=0, is that the tubular roller members may be held from turning about vertical members 26 when lateral forces are applied. Alternately, the horizontal top member can have a larger diameter at locations where support brackets 30 are placed to provide the desired offset distance D.

The lateral forces are indicated by the F arrows and the turning moments by the curved T arrows in FIG. 6. Offset distance D is determined by the lateral dimensions of the vertical member and the outer diameter of the tubular roller member, as well as the wall thickness of the tubular roller member. The configuration and design of top support bracket along with fasteners and a spacer member can vary within the scope of this invention in keeping with the functional requirements of protector assembly A. That is, being able to freely rotate both the horizontal top member within the top support bracket and the tubular roller member about the vertical member is important for the proper operation of the protector assembly.

Horizontal bottom member 24 is held from lateral displacement relative to the dock by bottom support fixture 40 of FIG. 6. Once again, removal of removable fastener 46 allows a major portion of the protector assembly or fence type structure to become free from bottom brace 44 and capable of being rotated with respect to top support bracket 30.

Docks are made with a supporting structure that can vary from one dock to the next depending on how the owner constructs the dock for his particular use. For floating docks the water surface 12 is generally maintained at a rather constant dock water depth distance W1 below the top surface 10a of the dock, as illustrated in FIG. 7. A dock structure 110 supports the dock without extending into the water to prevent deterioration of the dock structure. In another aspect of the invention, protective assembly A has a bottom support fixture 140 which is connected to the dock structure, as shown in FIG. 7. The dock structure in this case is laterally inset from the side surface 10b of the dock. The bottom support fixture again has a bottom support member 142 connected to a bottom brace 144 with a removable fastener 146. An angle adjustment member 148 has at least one brace fastener 148a that fixes bottom support fixture 140 to dock structure 110. A previously disclosed, the removable fastener is displaced so that the protector assembly can be rotated upward, as shown by the R arrow, for cleaning, repairing and removal of debris.

In another aspect of the invention, a dock structure may exist at the side surface 10b of the dock. In this case a bottom support fixture 240 may be provided by a direct connection to dock structure 210, as illustrated in FIGS. 8 and 9. The partial elevation view of FIG. 9 is taken along line 9—9 of FIG. 8. A bottom support member 242 is placed around vertical member 26 by providing the tubular roller member in two parts; being an upper roller member 20a and a lower roller member 20b. At least one removable fastener 246 is provided for fixing the protector assembly to dock structure 210. A spacer member 34 may be required between the vertical member and the dock structure to provide another offset distance at the location of dock structure 210 so that roller member 20a is free to turn about vertical member 26. Roller member 20a is vertically supported by bottom support member 242. Alternately, the bottom support fixture can be designed to provide an offset distance so that the roller member is free to turn. Once again, the removable fastener is displaced so that the protector assembly can be rotated upward, as shown by the R arrow, for cleaning, repairing and removal of debris.

A series of protector assemblies or fence type structures are placed along the side surface of a dock to protect a longer length of the dock. This provides space for docking of water craft at various locations along the side surface of the dock, including more than one water craft being docked at the same side surface at the same time. In the partial elevation view of FIG. 10, the end sections of protector assemblies A and A' are illustrated as being connected near horizontal bottom member 24. Vertical end members 26e both have a connector 25 with a connector member 27 between the two connectors holding the vertical end members a selected end space distance S' apart. End roller members 20c preferably rest on the top of connectors 25. The protector assemblies are held at the top by the normal top support brackets of the invention (see FIG. 3). If desirable, a second connector assembly can be used near the horizontal top member within the scope of this invention.

The preferred means for building the horizontal top and bottom members interconnected with vertical members is to use standard pipe fittings, as illustrated in FIG. 11 for the horizontal bottom member. Standard T shaped fittings are used to connect horizontal bottom member portion 24a with horizontal bottom member portion 24b. The horizontal bottom member portions become standard tubular pipes. Vertical members 26 are again spaced apart a selected spacing S, as previously disclosed. At the longitudinal ends of each protector assembly A, another T shaped fitting can again be used. This provides for adjacent protector assemblies to be connected using a standard pipe connecting member. The same means is preferred for constructing a horizontal top member 22 of the invention. In this manner a major portion of the fence type structure can be easily assembled.

While a preferred embodiment of the invention has been described using specific terms, such description is for illustrative purposes only, and it is to be understood that changes and variations may be made without departing from the spirit or scope of the following claims.

What is claimed is:

1. A protector assembly to be attached to a dock along a side area of the dock for safe operation of a water craft in water adjacent the dock, said assembly comprising:

horizontal top and bottom members adapted to be placed parallel to the side area of the dock so that said top member is adapted to be rotatably attached to the dock and said bottom member is generally positioned below a surface of the water;

a plurality of spaced apart vertical members each affixed at a top end to said horizontal top member and at a bottom end to said horizontal bottom member to generally form a protective fence;

a tubular roller member placed around each one of said vertical members to generally extend between said horizontal top and bottom members so that said roller members freely rotate about said vertical members when forced to turn by making contact with the water craft; and a plurality of top support brackets for pivotally attaching said horizontal top member to the side area of the dock such that said fence can be rotated upward about the horizontal top member and relative to the dock for cleaning and repairing the fence as well as removal of debris.

2. The assembly of claim 1 including:

a bottom support fixture for holding said horizontal bottom member in a general location directly below said horizontal top member near said surface of the water, wherein releasing said bottom support fixture allows said fence to be rotated about said top support brackets.

3. The assembly of claim 2 wherein said bottom support fixture includes:

a bottom support member for holding the horizontal bottom member from moving relative to the dock; and a removable fastener for holding the bottom support member in place when installed and for releasing said bottom support member when said fastener is displaced.

4. The assembly of claim 3 wherein the bottom support fixture further includes:

a bottom brace attached to said bottom support member by said removable fastener at one end and to an angle adjustment member at the other end; and at least one brace attachment member connected with said angle adjustment member and including fasteners to attach said attachment member to the dock for holding said bottom brace and said horizontal bottom member in a generally fixed position relative to the dock.

5. The assembly of claim 1 including;

at least a pair of spacer members adapted to be positioned between the side area of the dock and said horizontal top member to provide a spacial distance so that said tubular roller members are free to rotate about said vertical members when contacted by the water craft.

6. The assembly of claim 1 wherein said top support brackets include a spacer-portion to offset said horizontal top member an offset distance from the side area of the dock so that said tubular roller members are free to turn about said vertical members.

7. The assembly of claim 1 wherein said horizontal top and bottom members are made using standard T shaped pipe fittings interconnected by tubular pipe sections, wherein said pipe fittings receive said vertical members, having standard tubular pipe sections, to form said fence.

8. The assembly of claim 7 wherein said horizontal top and bottom members and said vertical members are made using one of either a plastic material or a metallic material.

9. The assembly of claim 1 wherein said vertical members have a vertical member spacing in a range of about four inches to about eight inches.

10. A fence structure for preventing a water craft from making contact with a side surface of a dock structure while docking, said fence structure comprising:

a horizontal top member adapted to be rotatably attached to the side surface of the dock structure using at least one support bracket;

a horizontal bottom member located below the horizontal top member to be positioned generally below the surface of the water adjacent the dock structure;

vertical spaced apart members having a top end affixed to said horizontal top member and a bottom end affixed to said horizontal bottom member to form a protective fence, wherein the protective fence can be rotated upward about the horizontal top member and said at least one support bracket;

a tubular roller member coexisting with each vertical member such that said vertical member extends freely through said tubular roller member to provide vertical support for said roller member without limiting the ability of said roller member to rotate when contacted by the water craft.

11. The fence structure of claim 10 including;

a bottom support fixture for holding said horizontal bottom member in a general location directly below said horizontal top member near said surface of the water.

12. The fence structure of claim 11 wherein said bottom support fixture includes:

a bottom support member for holding the horizontal bottom member from moving relative to the dock structure; and a removable fastener for holding the bottom support member in place when installed and for releasing said bottom support member when said removable fastener is displaced.

13. The fence structure of claim 11 wherein said bottom support fixture includes:

a bottom brace adapted to extend from said bottom support member to the dock structure;

an angle adjustment member attached to an upper end of said bottom brace; and at least one brace fastener for affixing said bottom support fixture to the dock structure.

14. The fence type structure of claim 10 wherein said vertical members have a vertical member spacing in a range of about four inches to about eight inches.

15. The fence structure of claim 14 wherein said protective fence has an overall vertical height in a range of about twenty inches to about thirty inches and an overall length in the range of about three feet to about ten feet.

16. The fence structure of claim 10 wherein said horizontal top and bottom members are made using standard pipe fittings interconnected by standard tubular pipe sections, wherein said pipe fittings receive said vertical members and are made using standard tubular pipe sections, and wherein said standard pipe and pipe fittings are assembled to form the fence type structure.

17. The fence structure of claim 16 wherein the size of said standard pipe fittings and said standard tubular pipe vary from conventional sizes of about three quarters of an inch to about one and one quarter inches in diameter, and wherein said tubular roller members are each of a standard pipe size at least one size larger than the size of a respective vertical member.

18. The fence structure of claim 17 wherein said horizontal top and bottom members, said vertical members and said tubular roller members are each made using one of either a plastic material or a metallic material.

19. The fence structure of claim 18 wherein said horizontal top and bottom members, said vertical members and said tubular roller members are made using a polyvinyl chloride (PVC) material.

* * * * *